United States Patent [19]
Thompson

[11] 3,985,101
[45] Oct. 12, 1976

[54] MARINE ORGANISM REARING SYSTEM

[76] Inventor: Jerome C. Thompson, Star Route Sutcliffe, Reno, Nev. 89510

[22] Filed: July 2, 1975

[21] Appl. No.: 578,434

Related U.S. Application Data

[62] Division of Ser. No. 431,451, Jan. 7, 1973, abandoned.

[52] U.S. Cl. .................................. 119/2; 119/4
[51] Int. Cl.² ............................... A01K 61/00
[58] Field of Search ........................... 119/2, 3, 4

[56] References Cited
UNITED STATES PATENTS

| | | | |
|---|---|---|---|
| 2,982,246 | 5/1961 | Kidder | 119/2 X |
| 3,658,034 | 4/1972 | Day et al. | 119/4 |
| 3,724,423 | 4/1973 | Day et al. | 119/4 |

Primary Examiner—Hugh R. Chamblee

[57] ABSTRACT

The trough of this invention comprises a tank having a bottom wall and side walls, and means for distributing solution of the upper portion of one of the terminal ends of the trough and means for discharging solution from the lower portion of the end opposite the end having the distributing means for removing solution and excrescence in suspension; and the trays having means for retaining organisms to be reared in the system disposed substantially upstandingly and transversely in the tank.

3 Claims, 3 Drawing Figures

MARINE ORGANISM REARING SYSTEM

REFERENCE TO OTHER APPLLICATIONS:

This application is a division of Application Ser. No. 431,451 filed Jan. 7, 1973, now abandoned.

FIELD OF INVENTION:

The present invention relates to pisciculture, and more particularly to aquatic cultures of crustaceans including shrimps and the like.

DESCRIPTION OF THE PRIOR ART:

The prior art for rearing shrimps and the like in intensive cultures has been characterized by various types of pond cultures wherein organisms are permitted free migration throughout the enclosure, and certain storage devices wherein solution is cycled in a vertical pattern wherein solution cascades through each tray or pond. The prior art of multiple culture or networks of rearing systems has been characterized by predominantly a class of open-circuit systems wherein fresh solution is cycled through the ponds once and is discharged as affluent; and by certain closed-circuit systems wherein solution is pumped in series from one pond or enclosure to the next.

It is another primary object of this invention that solution may be circulated through the rearing troughs, equally or substantially equally to all parts of the trough, and discharge means be provided for withdrawing the solution used in the trough and to remove excrescence in solution from each trough. It is still another primary object of this invention to provide a multiplicity of trays which may be disposed transversely of the stream of circulating solution in the troughs to retain a predetermined number of organisms at a predetermined density in each portion of the tanks volume, and thereby result in a substantially uniform, predetermined density.

It is an object of this invention that the trays be fabricated to permit convenient seating of the trays with organisms to be reared, and to permit convenient insertion or withdrawal of the trays from the tank.

These and other objects shall become apparent from the description following, it being understood that modifications may be made without affecting the teachings of the invention here set out.

SUMMARY OF INVENTION:

The trough of this invention comprises a tank having a bottom wall and side walls, and means for distributing solution of the upper portion of one of the terminal end of the trough and means for discharging solution from the lower portion of the end opposite the end having the distributing means for removing solution and excrescence in suspension; and the trays having means for retaining organisms to be reared in the system disposed substantially upstandingly and transversely in the tank.

A more thorough and comprehensive understanding may be had from the detailed description of the preferred embodiment when read in connection with the drawings forming a part of this specification.

Figure 1:
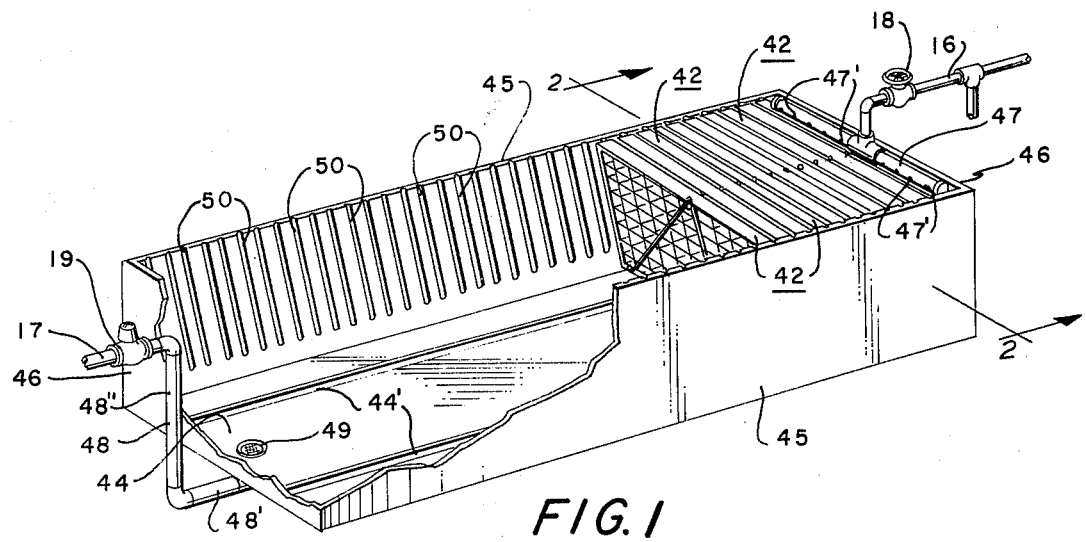
FIG. 1 is a prospective view of a typical trough shown with walls broken away for illustrative purposes showing to advantage a multiplicity of rearing trays disposed therein.

DETAILED DESCRIPTION OF THE PREFERRED EMBODIMENT:

As shown in the FIG. 1, the tank 41 comprises a bottom wall 44, and upstanding side walls and end walls 45 and 46 respectively which issue upwardly from the bottom wall 44. As set out above, the input conduit 16 is provided with means for discharging solution at the upper portion of one end wall r6. Means for discharging solution coextensively across the tank 41 may include a horizontally, transversely disposed tube 47 having exitways 47' connected to the end of the input conduit 16. As shown more clearly in the FIG. 1 the discharge conduit 17 is connected adjacent the end wall 46 opposite the end wall carrying the conduit 16 by a standpipe 48. The standpipe 48 is an upstanding, substantially L-shaped conduit, having a horizontal portion 48' connected to a drain 49 in the bottom wall 4, and having a vertical portion 48" connected to the discharge conduit 17 by the vented connection 19. It may be seen that the height of the vertical portion 48" may be employed to control height of solution in the trough 11.

A multiplicity of trays 42 are disposed parallelly substantially upstandingly, and transversely of the tanks 41. Each of the trays 42 is retained by recesses 50 disposed in the side walls 45. As shown in the FIG. 2, the recesses 50 are disposed at an acute angle to the vertical with their uppermost terminal end disposed toward the discharge end of the tank 41 and the lowermost terminal end disposed distally above the bottom wall 44. The recesses 50 are engaged by tray guides 42' disposed centrally to the outermost terminal ends of trays 42 to retain the trays 42 in their respective positions. A pair of support rails 44' are provided for spacing the trays 42 distally from the bottom wall 44 to substantially increase circulation of solution and removal of excrement produced therein. It is to be understood that angular disposition of the trays 42 facilitates infiltration of food particles, as shall become clear hereinafter.

Figure 2:
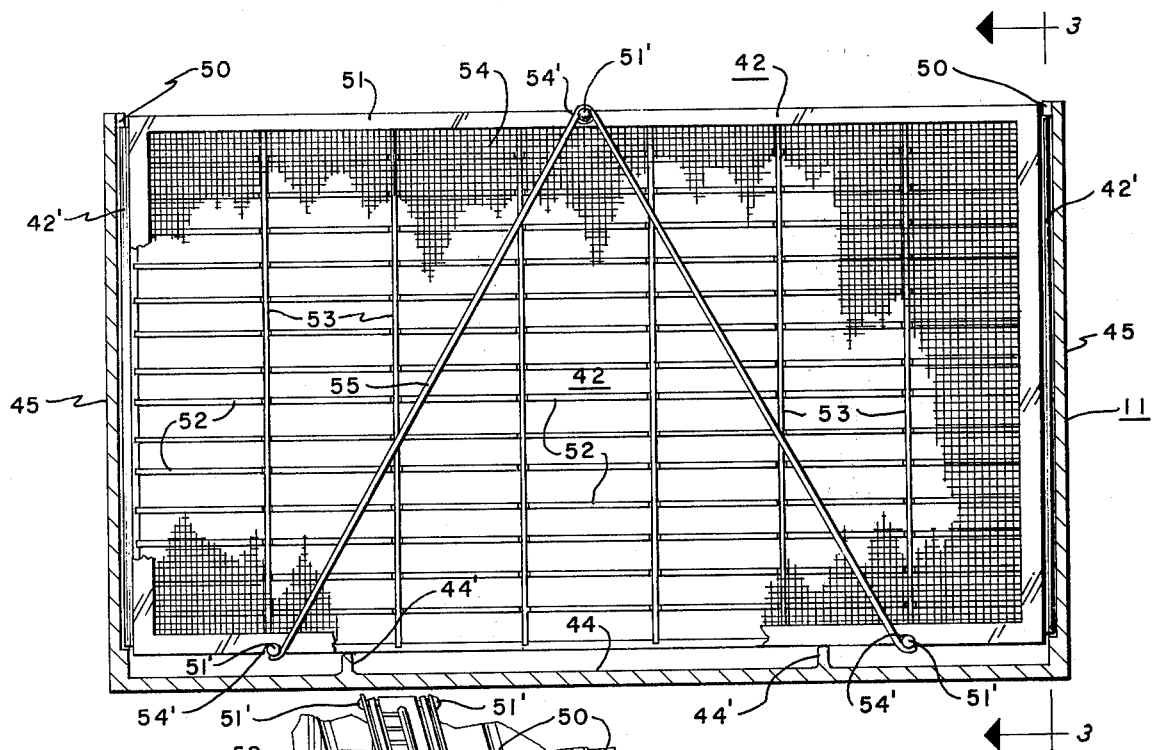
FIG. 2 is a cross-sectional view taken substantially along the lines 2—2 of the FIG. 1, showing an elevational rear view of the trays as they appear in the trough.
Figure 3:
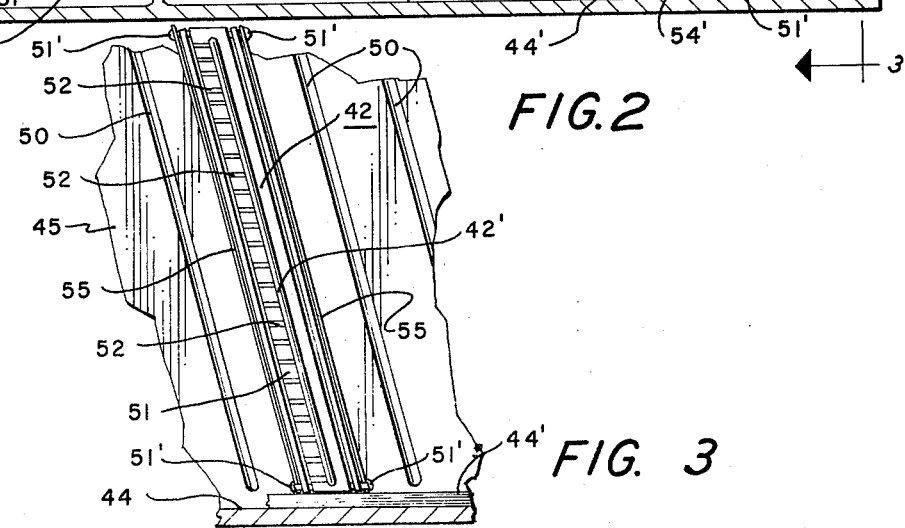
FIG. 3 is a cross-sectional view taken substantially along the lines 3—3 of the FIG. 2.

Referring to the FIG. 2, each of the trays 42 comprises a rectangular frame 51, a plurality of rectilinear and transverse dividers 52 and 53 respectively, which are slidably engageable to each other to produce a multiplicity of compartments into which shrimp are disposed, and fabric screens 54 disposed on each side of the trays. It has been found to advantage to provide means for access to the enclosures. This may be brought about by detachably mounting the screens 54 to the frame 51 of which is provided with holding lugs 51' disposed on each of its terminal sides. The lugs 51' project outwardly from the frame 51 and are disposed in an upright-triangle-like pattern. The screens 54 are provided with lug recesses 54' that are coextensive with the lug 51'. The screens 54, frame 51 and dividers 52 and 53, are held together in a sandwich fashion by spring-like wire retainers 55 disposed on both sides of the tray 42 and held in their respective angular retaining position by the lugs 51'.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A trough for rearing aquadic cultures of rearing crustanceans, comprising: in depth a tank having a bottom wall and side walls, in an input conduit being disposed in the upper portion of one of the terminal ends of said conduit and a discharge being disposed of the end opposite said input conduit in the lower portion of said tank: a plurality of substantially upstanding transversely disposed trays removably mounted in said tanks, said trays having means for retaining said crustaceans in a predetermined density over said trays, said means for controlling distribution of said crustaceans includes a rectangular frame a plurality of rectilinear transverse dividers mounted to said frame and to each other, and screen disposed on each side of said trays.

2.. The apparatus of claim 1 wherein said tray is provided with means for detachably mounting said fabric to said tray to provide access thereto.

3. The apparatus of claim 1 wherein said trays are disposed at an acute angle to the verticle in said tanks.

* * * * *